(12) United States Patent
Byrd, II et al.

(10) Patent No.: US 6,228,355 B1
(45) Date of Patent: May 8, 2001

(54) SYSTEM FOR THE CONTROL OF ENTEROPATHOGENIC BACTERIA IN THE CROPS OF POULTRY

(75) Inventors: James A. Byrd, II, Bryan, TX (US); Larry H. Stanker, Livermore, CA (US); Donald E. Corrier, deceased, late of College Station, TX (US), by Juanita P. Corrier, legal representative

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/592,777

(22) Filed: Jun. 13, 2000

(51) Int. Cl.$^7$ ....................................................... C12N 1/20
(52) U.S. Cl. .................. 424/93.1; 424/93.45; 424/93.46; 424/429; 424/461; 424/463; 426/2
(58) Field of Search ................................ 424/93.1, 93.45, 424/93.46, 429, 461, 463; 426/2

(56) References Cited

U.S. PATENT DOCUMENTS 5,153,037   10/1992   Altieri ................................. 428/35.6
5,186,990   2/1993   Starcevich ........................... 428/35.6

FOREIGN PATENT DOCUMENTS 8302955   9/1983   (WO) ................................ C13L/1/08
WO 00/08949 *   8/1999   (WO) .................................. 424/93.1

* cited by examiner

*Primary Examiner*—Jean C. Witz
*Assistant Examiner*—Randall Winston
(74) *Attorney, Agent, or Firm*—M. Howard Silverstein; Randall E. Deck; John D. Fado

(57) ABSTRACT

The invention provides a method and compositions for controlling food borne enteric bacterial pathogens in poultry populations. The incidence of the colonization of poultry by enteropathogenic bacteria, and/or the populations of enteropathogenic bacteria within colonized poultry, may by substantially reduced by providing particles of an expanded matrix material to the locus or vicinity of the animals, particularly during the period of feed removal prior to slaughter. The method and compositions are particularly useful for the control of Salmonella species, enteropathogenic *Escherichia coli,* and Campylobacter species.

23 Claims, No Drawings

SYSTEM FOR THE CONTROL OF ENTEROPATHOGENIC BACTERIA IN THE CROPS OF POULTRY

BACKGROUND OF THE INVENTION

1. Field of the Invention

This invention relates to a process for the control of enteric bacterial pathogens in animals using expanded matrix materials.

2. Description of the Prior Art

Despite the efforts of researchers and public health agencies, the incidence of human infections from enteropathogenic bacteria such as Salmonella, *E. coli* 0157:H7, and Campylobacter has increased over the past 20 years. For example, the number of actual reported cases of human Salmonella infection exceeds 40,000 per year. However, the Communicable Disease Center estimates that the true incidence of human Salmonella infections in the United States each year may be as high as 2 to 4 million. The USDA Economic Research Service has recently reported that the annual cost of the food borne illnesses caused by six common bacterial pathogens, Campylobacter spp., *Clostridium perfringens, Escherichia coli* 0157:H7, *Listeria monocytogenes,* Salmonella spp., and *Staphylococcus aureus,* ranges from 2.9 billion to 6.7 billion dollars (Food Institute Report, USDA, AER, December, 1996). In addition to the impact of enteric pathogens on human health, many of these bacteria also cause significant infections in animals. For example, Salmonella infections in swine alone cost the United States swine industry more than 100 million dollars annually (Schwartz, 1990, "Salmonellosis in Midwestern Swine", In: Proceedings of the United States Animal Health Assoc., pp. 443–449).

Animal food products remain a significant source of human infection by these pathogens. Contamination of meat and poultry products with many bacterial food-borne pathogens, including the particularly onerous pathogens Campylobacter spp., *Escherichia coli* 0157:H7, and Salmonella spp., often occurs as a result of exposure of the animal carcass to ingesta and/or fecal material during or after slaughter. Any of the above-mentioned pathogens can then be transmitted to humans by consumption of meat and poultry contaminated in this manner.

Preharvest control of enteropathogenic bacteria is a high priority to the food industry. However, few products have been developed to facilitate such efforts. Currently, preharvest pathogen control within the poultry industry is accomplished through use of competitive exclusion cultures or probiotics. In fact, at this time, only one such product, developed by Nisbet et al. of the USDA Agricultural Research Service (U.S. Pat. No. 5,478,557) and sold under the trademark PREEMPT (Milk Specialties Biosciences, Dundee, Ill.), is available commercially in the United States. Moreover, the administration of competitive exclusion cultures is preferably targeted to very young animals. Immune lymphokines (ILK) have also been recently developed for protecting poultry from colonization with enteric pathogens as described by Ziprin et al. (1989, Poult. Sci., 68:1637–1642), McGruder et al. (1993, Poult. Sci., 72:2264–2271), Ziprin et al. (1996, Avian Dis., 40:186–192), and Tellez et al. (1993, Avian Dis., 37:1062–1070), and more recently by Kogut et al. (U.S. Pat. Nos. 5,891,443 and 5,691,200).

Despite these advances, the need persists for technologies for controlling enteric pathogens in animals, and particularly for the treatment of animals immediately prior to slaughter.

SUMMARY OF THE INVENTION

We have now discovered a method and compositions for controlling the spread of food borne enteric bacterial pathogens in poultry populations. The incidence of the colonization of poultry by enteropathogenic bacteria, and/or the populations of enteropathogenic bacteria within colonized poultry, may by substantially reduced, by providing particles of an expanded matrix material to the locus or vicinity of the animals, particularly during the period of feed removal prior to slaughter. The method and compositions are particularly useful for the control of Salmonella species, enteropathogenic *Escherichia coli,* and Campylobacter species.

In accordance with this discovery, it is an object of this invention to provide a method for controlling food borne enteropathogenic bacteria in animals.

Another object of this invention is to provide a method for controlling the spread of enteropathogenic bacteria between animals in a population of poultry.

Yet another object of this invention is to provide a method for significantly reducing the populations of enteropathogenic bacteria in meat producing animals prior to slaughter.

Other objects and advantages of this invention will become readily apparent from the ensuing description.

DETAILED DESCRIPTION OF THE INVENTION

During the processing of poultry in slaughterhouses, carcasses may become inadvertently exposed to ingesta and/or fecal material. Consequently, contamination of the poultry product may occur if the ingesta or fecal material contain bacterial food-borne pathogens such as Campylobacter spp., *Escherichia coli* 0157:H7, and Salmonella species. The contamination of carcasses with feces or ingesta in this manner is the primary source of contamination of poultry with these pathogens.

In an effort to reduce bacterial/fecal carcass contamination in the United States, commercially produced poultry are now deprived of feed prior to their transport to the slaughterhouse. However, while this practice successfully reduces the amount of ingesta and fecal material in the bird's gut and hence decreases fecal contamination levels during processing, bacterial levels in the upper gastrointestinal tract (crop) are increased. In fact, the number of birds with crops contaminated with Salmonella or other pathogens increases from as low as 1–2% prior to feed withdrawal, to as much as 60% or more by the time of slaughter. This increase is primarily due to the birds' consumption of feces and litter lying in their vicinity; once feed has been withdrawn, the birds characteristically tend to peck at and consume feces and litter on the floor of their enclosure. Thus, bacterial pathogens may be quickly spread throughout the population. Moreover, feed withdrawal also effects an increase in the pH of the crop, providing an environment in the crop more conducive to the growth of the pathogens.

In accordance with this invention, we have discovered that the contamination of poultry with bacterial pathogens may be controlled by providing particles of an expanded matrix material to the locus or vicinity of the poultry population. Interestingly, the poultry will preferentially consume the particulate expanded matrix material rather than the feces and litter, thereby reducing the uptake of the pathogenic bacteria. Either or both of the spread of the bacterial pathogens among the population (i.e., the incidence or number of birds contaminated or colonized with the pathogens), as well as the concentration of the pathogens in the birds, may be significantly reduced in comparison to untreated controls. Moreover, in a preferred embodiment, even greater control of the pathogens may be achieved by incorporating one or more disinfectants or bactericidal agents in the particles.

Virtually any enteropathogenic bacterium may be controlled in accordance with this technique, including but not limited to Salmonella species, enteropathogenic *Escherichia coli* 0157:H7, and Campylobacter species. While the process may be used for the treatment of a variety of poultry, it is preferred for use with meat producing poultry such as ducks, geese, and particularly chickens and turkeys where large populations are commonly reared in confined pens or enclosures.

In the preferred embodiment, the particles of expanded matrix material are provided to the poultry during any period of feed removal or restriction. In the particularly preferred embodiment, the particles are provided during the period of feed removal which is instituted prior to slaughter (also referred to as processing) and/or transport to the slaughterhouse. Although the precise time of the feed withdrawal may vary between producers, it will typically be within about 1 day prior to slaughter of the poultry, most often within about 12 to 24 hours prior to slaughter, and may be less than or equal to about 10 hours prior to slaughter. As a practical matter, the particles are provided at or shortly before the time that feed is removed to minimize consumption of fecal material and litter by the poultry. It is also understood that the use of the particles of expanded matrix material is not limited to the period prior to slaughter. For instance, the particles may be provided to the poultry to prevent or treat illness within the poultry population.

The particles of the expanded matrix material are provided in the vicinity of the poultry in an amount or density effective to significantly reduce or eliminate their consumption of fecal material and litter relative to an untreated population. Thus, the amount should be sufficient that the particles are readily available for consumption by the birds over the course of the feed withdrawal period, substantially without their reverting to consumption of fecal material and litter. The specific amount may vary with the extent of the period of feed withdrawal, the type floor litter used, and the population density of the birds. However, in the preferred embodiment, the particles are distributed or spread on the floor or ground within the enclosure in which the poultry are maintained in an amount effective to cover approximately 10% or more of the floor area. In a particularly preferred embodiment, a sufficient amount of the particles are provided to cover approximately 25% or more of the floor area.

The particles for use in this invention may be prepared from a wide variety of expanded matrix materials, including but not limited to polymer foams (which may also be referred to as expanded polymers or cellular polymers), syntactic foams, or extruded and expanded grains. As defined herein, the expanded matrices are solid structures comprising voids filled with a gaseous phase derived from a blowing agent or hollow microparticles, which are surrounded or partially surrounded by a solid polymer matrix. The blowing agents may be introduced chemically, physically, or mechanically. A variety of methods for preparing expanded matrix materials from numerous base materials are known in the art and the selection of the particular method and material is not critical. Furthermore, as described in greater detail hereinbelow, other optional solid and/or liquid phase materials may also be included within or on the matrix.

In a first preferred embodiment, the expanded matrix is a polymer foam, prepared from a single polymer or a mix or blend of different polymers, which may be naturally occurring or synthetic polymers or copolymers. Without being limited thereto, examples of naturally occurring polymers which are suitable for use herein include carbohydrates, polysaccharides, celluloses, and starches. Starch derivatives such as modified starches and starch-graft copolymers may also be used. In addition, polystyrene, polyurethanes and other isocyanurate based polymers, polycaprolactams, polycyclopentadienes, polyolefins, polyvinylchlorides (PVC), epoxy resins, urea-formaldehyde resins, latex, silicones, fluoropolymers, and other synthetic polymers may also be suitable for use.

Generally, biodegradable polymers are preferred, particularly starch, modified starch, and starch-graft copolymers, to minimize the accumulation of waste in the poultry house and simplify its disposal. Such biodegradable materials will bioerode relatively quickly in gut, reducing the volume of ingesta and fecal material. Starches may be derived from any available source. However, even though such biodegradable starch-based polymers are generally preferred, their combination with synthetic polymers may provide enhanced strength, structural stability, or other desired properties.

Many techniques have been previously described for the preparation of polymer foams which are suitable for use herein, and particularly for the well-known particulate polymer foams such as loose fill packing or "peanuts". The selection of the particular technique is not critical and is a matter of choice. Representative non-limiting examples of synthetic polymers and techniques for producing polymer foams which may be used herein are described by Klempner and Frisch (editors, Handbook of Polymeric Foams and Foam Technology, Hanser Publishers, Munich, 1991), Throne (Thermoplastic Foams, Sherwood Publishers, Hinckley, Ohio, 1996), Stober (U.S. Pat. No. 2,576,977), Ropiequet (U.S. Pat. No. 3,961,000), Stochdopole et al. (U.S. Pat. No. 3,723,240) and Holden (U.S. Pat. No. 3,188,264). Examples of several techniques which may be used for producing polymeric foams from starch, starch containing materials, modified starch, or starch-graft copolymers, include but are not limited to those described by Altieri (U.S. Pat. No. 5,153,037), Protzman (U.S. Pat. No. 3,137,592), Fisk (U.S. Pat. No. 5,853,848), Lacourse (U.S. Pat. Nos. 5,043,196 and 5,863,655), Neuman et al. (U.S. Pat. No. 5,208,267) and Ernst (International application WO8302955 or European patent 0087847). The contents of each of the above mentioned publications and patents are incorporated by reference herein.

In an alternative embodiment, the expanded matrix material may be prepared from syntactic foams. Although closely related to polymer foams, syntactic foams are produced by forming the polymer matrix around hollow or gas filled microparticles or microspheres. Techniques for the preparation of syntactic foams are also known in the art and are described by Klempner and Frisch (ibid).

In another preferred embodiment, the expanded matrix may also be prepared from extruded and expanded grains. Briefly, one or more of corn, wheat, rice or other grain are mixed with a binding agent, a blowing agent or water is incorporated therein, and the mixture is then extruded under heat and pressure. Preferred techniques for producing the expanded and extruded grain are described, for example, in Starcevich (U.S. Pat. No. 5,186,990, the contents of which are incorporated by reference herein).

The physical properties of the expanded matrix material are not critical. The expanded matrix may be open or closed cell, or flexible or rigid, although rigid to semi-rigid matrices are preferred. The particle size and shape are also variable, although the particles should be large enough to be readily distinguished by the birds when they are distributed in the holding facility. Accordingly, if the particles are to be spread on a floor which is covered with litter, the particles should be larger than the litter and droppings, preferably greater than or equal to about 0.5 cm in each dimension, with dimensions between about 0.5 to 5.0 cm being preferred (e.g. diameter for substantially cylindrical or spherical particles).

Coloring agents may be incorporated into the matrix or provided on the surface hereof to impart color to the particulate material. Interestingly, poultry typically exhibit a preference for particles which are natural or white (reflecting substantially all wavelengths of light within the visible spectrum at substantially the same reflectance, i.e. the ratio of intensity of incident to reflected light), green (reflecting wavelengths within the visible spectrum only at approximately 530 nm), or black (absorbing substantially all wavelengths of light within the visible spectrum at substantially the same reflectance).

The particles of the expanded matrix material may also function as carriers for delivery of the active agents to the poultry. When used in combination with biodegradable particles, the matrix will bioerode in the upper gastrointestinal tract and crop of the bird, releasing the agents. Thus, in a preferred embodiment, improved control of the enteropathogenic bacteria may be effected by incorporating one or more bactericidal or bacteriostatic agents (compounds) effective against the bacteria into the particles. Without being limited thereto, preferred agents include organic acids, alcohols, organic solvents, and cationic detergents (including cationic bisiguanides such as chlorhexidine and cyclohexidine), iodine, iodophores (i.e. povidoneiodine). Particularly preferred agents include citric acid, lactic acid, and/or limonene. It is also understood that other adjuvants conventional in the art for the treatment of the animals may also be formulated in the particles, such as antitoxins, deworming agents, therapeutic antibiotics, and/or non-therapeutic levels of antibiotics.

The particles used herein are not to be confused with a nutritive feed for the poultry. Rather, the particles are provided to poultry during periods when their access to feed is to be removed or restricted. Thus, substantial amounts of nutrient additives typically found in commercial feeds, particularly supplements which are provided in addition to grains, such as one or more of vitamins, minerals (particularly sodium, calcium, and phosphorous), proteins, and amino acids (particularly lysine and tryptophan), are preferably not incorporated into the particles of this invention. In those embodiments whereon the expanded matrix is prepared from starch or a starch containing material such as flour, or from grains, the amounts of these vitamins, minerals, proteins, and amino acids would be substantially the same as normally present therein without added supplementation.

The following examples are intended only to further illustrate the invention and are not intended to limit the scope of the invention which is defined by the claims.

EXAMPLE 1

Particles of extruded and expanded grain (corn) were prepared using the procedure described by Starcevich (U.S. Pat. No. 5,186,990) except that corn starch and polyvinyl alcohol (PVA) were used rather than corn grits and guar gum. The average size of the final extruded material varied between 1–2 cm.

To determine the effect of the particles alone in comparison with particles containing different adjuvants, particles were prepared with no added adjuvants, with 2% lactic acid (LA), with 0.5% D-limonene (DL) plus 2% citric acid (CA), and with 0.5% D-Limonene plus 2% citric acid plus 0.5% dioctyl sulfosuccinate (DSS).

Populations of adult broiler chickens were deprived of feed and divided into one of five groups: 1, an untreated control; 2, chickens fed particles of extruded and expanded grain (BP) without adjuvants; 3, chickens fed particles of extruded and expanded grain containing lactic acid (BP+LA); 4, chickens fed particles of extruded and expanded grain containing D-limonene and citric acid (BP+DL+CA); and 5, chickens fed particles of extruded and expanded grain containing D-limonene, citric acid, and DSS (BP+DL+CA+DSS).

In a first trial, 8 hours after feed withdrawal, the crops of the chickens were examined for pH and Salmonella concentration. The results are shown in Table 1.

TABLE 1

| group | pH | Salmonella conc (log 10) | ST Sig |
|---|---|---|---|
| control | 5.43 | 0.73 | A |
| BP | 6.10 | 0.62 | AB |
| BP + LA | 5.62 | 0.65 | B |
| BP + LA + CA | 5.54 | 0.59 | AB |
| BP + LA + CA + DSS | 5.98 | 0.57 | AB |

In a second trial, the broilers were treated as in the first trial except that they were challenged with $10^8$ cfu of *Salmonella typhimurium* at 1 and 6 days prior to the termination of the experiment. Feed was removed on the last day, 8 hours prior to termination of the experiment, and particles were provided to the appropriate test groups, as in trial 1. Challenge of the poultry with Salmonella at an earlier time ensured that Salmonella would be excreted and present in the environment and in the litter prior to the feed withdrawal and provision of particles. The results are shown in Table 2.

TABLE 2

| group | S. typhimurium conc (log 10/ml) | ST Sig |
|---|---|---|
| control | 1.87 ± 1.66 | A |
| BP | 1.56 ± 1.29 | AB |
| BP + LA | 0.84 ± 1.22 | AB |
| BP + LA + CA | 1.69 ± 1.57 | B |
| BP + LA + CA + DSS | 1.21 ± 1.29 | AB | means with different letters indicate significant differences (P < 0.05)
data presented as mean + standard deviation, n = 20

It is understood that the foregoing detailed description is given merely by way of illustration and that modifications and variations may be made therein without departing from the spirit and scope of the invention.

We claim:

1. A method for controlling bacterial enteropathogens in poultry comprising providing particles of an expanded matrix material to the locus or vicinity of a population of said poultry during feed removal.

2. The method of claim 1 wherein said population of poultry is maintained within an enclosed area and said providing comprises spreading said particles across the ground within said enclosed area.

3. The method of claim 2 wherein said particles are applied in an amount effective to cover approximately 10% or more of said ground within said enclosed area.

4. The method of claim 3 wherein said particles are applied in an amount effective to cover approximately 25% or more of said ground within said enclosed area.

5. The method of claim 1 wherein said particles are provided within about 1 day prior to slaughter of said poultry.

6. The method of claim 5 wherein said particles are provided within about 12 hours prior to slaughter of said poultry.

7. The method of claim 1 wherein said matrix material is selected from the group consisting of polymer foams, syntactic foams, and extruded and expanded grains.

8. The method of claim 7 wherein said expanded matrix material is a polymer foam.

9. The method of claim 8 wherein said polymer foam comprises a biodegradable polymer.

10. The method of claim 8 wherein said polymer foam comprises a polymer selected from the group consisting of starch, modified starch, starch-graft copolymers, synthetic polymers, and mixtures thereof.

11. The method of claim 10 wherein said polymer comprises a polymer selected from the group consisting of starch, modified starch, starch-graft copolymers, and mixtures thereof.

12. The method of claim 7 wherein said expanded matrix material is an extruded and expanded grain.

13. The method of claim 1 wherein said particles of said expanded matrix material include one or more bactericidal or bacteriostatic agents.

14. The method of claim 13 wherein said bactericidal agents are selected from the group consisting of organic acids, alcohols, organic solvents, cationic detergents, iodine, and iodophores.

15. The method of claim 14 wherein said bactericidal agents are selected from the group consisting of citric acid, lactic acid, D-limonene, cyclohexidine, and mixtures thereof.

16. The method of claim 1 wherein said particles are substantially cylindrical or spherical with a diameter larger than or equal to approximately 0.5 cm.

17. The method of claim 16 wherein said diameter is between about 1.0 and 2.0 cm.

18. The method of claim 1 wherein said particles have light reflecting properties selected from the group consisting of: reflecting substantially all wavelengths of light within the visible spectrum at substantially the same reflectance, absorbing substantially all wavelengths of light within the visible spectrum at substantially the same reflectance, and reflecting wavelengths within the visible spectrum only at approximately 530 nm.

19. The method of claim 1 wherein substantial amounts of one or more nutrient supplements selected from the group consisting of minerals, proteins, amino acids, and vitamins are not incorporated into said particles.

20. The method of claim 19 wherein said expanded matrix material is produced from a starch containing material or grain, and the amounts of minerals, proteins, amino acids, and vitamins do not substantially exceed the levels present therein without supplementation.

21. A method for controlling bacterial enteropathogens in poultry comprising:

a. removing feed from a population of poultry, and b. providing particles of an expanded matrix material to the locus or vicinity of said population of poultry during the feed removal.

22. The method of claim 21 wherein said feed is removed and said particles are provided within about 1 day prior to slaughter of said poultry.

23. The method of claim 22 wherein said feed is removed and said particles are provided within about 12 hours prior to slaughter of said poultry.

* * * * *